United States Patent [19]

Dabin

[11] Patent Number: 4,896,352
[45] Date of Patent: Jan. 23, 1990

[54] TELEPHONE SET CIRCUIT INCLUDING AN OVERVOLTAGE PROTECTION

[75] Inventor: Emmanuel Dabin, Voiron, France

[73] Assignee: SGS-Thomson Microelectronics S.A., Gentilly, France

[21] Appl. No.: 200,776

[22] Filed: Jun. 1, 1988

[30] Foreign Application Priority Data

Jun. 5, 1987 [FR] France ................................ 8707946

[51] Int. Cl.⁴ .......................................... H04M 1/00
[52] U.S. Cl. ...................................... 379/412; 379/387
[58] Field of Search ............... 379/412, 387, 413, 377, 379/378, 380, 394, 400

[56] References Cited

U.S. PATENT DOCUMENTS

| | | | |
|---|---|---|---|
| 4,268,723 | 5/1981 | Taylor | 379/387 |
| 4,475,012 | 10/1984 | Coulmance | 379/412 X |
| 4,626,626 | 12/1986 | Coulmance | 379/394 |
| 4,636,588 | 2/1985 | Nakayama et al. | |

FOREIGN PATENT DOCUMENTS 2538661 6/1984 France .

Primary Examiner—Jin F. Ng
Assistant Examiner—Randall S. Vaas
Attorney, Agent, or Firm—Lowe, Price, LeBlanc, Becker & Shur

[57] ABSTRACT

In order to insure the protection of telephone set circuits when overvoltages generated from the telephone line occur, without impairing the operation of the set when hooking off the handset, the instant invention provides for a protection circuit incorporated into the integrated circuit fulfilling the main functions of the set. This protection circuit limits the current used by the integrated circuit top a first value (120 milliamperes) for the 250 milliseconds which follows the hooking off of the handset, then to a second value (60 milliamperes). If an overvoltage occurs, generated from the line, a time-delay of 100 milliseconds occurs before assigning a supplementary current limitation to 30 milliamperes. According to the invention, this time-delay may be as short as 100 milliseconds since it is initiated only if the first time period of 250 milliseconds is completed.

1 Claim, 3 Drawing Sheets

TELEPHONE SET CIRCUIT INCLUDING AN OVERVOLTAGE PROTECTION

TECHNICAL FIELD

The instant invention relates to internal electric circuits for subscribers' telephone sets.

BACKGROUND OF THE INVENTION

Those circuits are connected with one end of a two-wire telephone line, the other end of which is connected with the telephone exchange controlling several similar lines.

Those internal circuits of a subscriber's set are designed for carrying out several functions, among which:

reception of a ringing signal sent by the telephone exchange, emission of a signal indicating that the receiver has been hooked off, emission of the speech signals and reception of the speech signals;

emission of the dialling signals for calling another subscriber identified by those signals.

Those functions must be carried out without defect within operating conditions that may vary a lot from one set to another, especially in relation with the distance between the set and the telephone exchange and in relation with the operating voltage level of the line (the power supply of the set is obtained from the telephone exchange through the line).

Moreover, the various functions must be carried out without errors even under certain abnormal operating conditions, and if they cannot be carried out in those abnormal conditions, the set circuits must anyhow be protected in order not to be destroyed by those abnormal conditions.

One of those abnormal conditions that the set must withstand without being destroyed is the accidental contact of one lead of the electrical power supply network; this network generally provides an electric power at a voltage of 220 volts RMS.

That is the reason why the telephone set internal circuits generally comprise several protection devices against those abnormal operating conditions.

An example of a circuit is shown in FIG. 1.

The circuit comprises two input terminals A and B each one being connected with one of the leads L1, L2 of a two-wire telephone line further connected with two terminals A', B' of a telephone exchange 10.

The circuit of the subscriber's set comprises the following main parts:

a circuit DS for ringing signal detection connected through a capacitor C between terminals A and B and adapted to detect the presence of a ringing signal sent on the line by the telephone exchange; this circuit then controls the operation of an electronic or electromechanic ring tone generator SO. The detection circuit of the ringing signal may be protected by a component (not shown) located between terminals A and B (bidirectional Zener);

after the ringing signal detection circuit DS is located a switch K1 connected with terminal A and a switch K2 connected with terminal B; these switches insulate from the line, when open, the whole set of the circuits except for the DS circuit and capacitor C which remain permanently connected with the line; the switches open when the handset is hooked down, they close when the handset is hooked off;

a rectifying bridge RD has two input terminals E, F and two output terminals G, H; terminal E is connected with switch K1, terminal F with switch K2; terminal G constitutes the common ground of the set circuits, terminal H is both the feeding terminal of those circuits and a terminal through which flow the signals coming from and going to the telephone exchange (speech, dialling, hook signals of the handset);

a circuit or a component CPP for primary protection is connected between terminals E and F for clipping at about 100 RMS volts the voltage received by the rectifying bridge in case of an accidental overvoltage from the line;

one or several integrated circuit(s) CI designed to carry out the various functions of the apparatus (except for the detection of the ringing signal); this (or these) circuit(s) handle the speech signals from a microphone MIC; they emit speech signals on a loudspeaker HP; they emit dialling signals by means of a dial or a digital keyboard CL. Only one circuit CI has been shown;

a stage EHT called "high-voltage stage" is located between the output terminal H of the rectifying bridge RD and an input terminal J of the integrated circuit, this stage being particularly intended to limit the maximal voltage applied to the integrated circuit which could not directly withstand a volage in the range of 50 to 100 volts which can occur under normal operating conditions at the output of the rectifying bridge RD. The integrated circuit is fed between terminal J and ground G;

finally, a secondary protection circuit CPS is connected between terminal H and ground G; it limits the power used by the high-voltage stage in case of overvoltage, by assigning a limitation of the current used by the high-voltage stage.

One of the main functions of integrated circuit CI (combined with the high-voltage stage EHT which feeds it) is to insure a voltage regulation on terminal J and a regulation of the current which flows from the high-voltage stage towards terminal J. Indeed, the dialling signals as well as the handset hook signal are in fact constituted by the presence or non-presence of a D.C. current higher than a determined threshold on the telephone line. This current is the current that is used by the set and it is essentially the one that flows from the high-voltage stage towards terminal J of the integrated circuit.

Since the current used by the set depends upon the voltage received between terminals E and F and since this voltage depends both upon the feeding voltage of the telephone exchange (which may considerably vary) and the line impedance (which also considerably varies according to the length of the line), the integrated circuit must control both the current and the voltage at point J for maintaining them within a well determined range for each set operating phase (speech reception phase, hook off phase after a call, hook up phase for calling, speech phase). To achieve this purpose, the integrated circuit comprises an output terminal K acting upon the biasing of the high-voltage stage for limiting the used current.

The instant invention particularly relates to what happens during a hook off phase of the handset in case of overvoltage on the line.

In practice, standards are as follows:

1. Calling interruption standard when "called": when the handset is picked up for answering a call, the telephone set starts using a non-null average current. This average current will be detected by the telephone exchange which, at the latest after 150 milliseconds following this detection, will have to stop the ringing signal in order to switch into a speech phase. In case of short lines, the average current will have to be at least equal to 30 milliamperes.

2. Speech phase:

when the speech phase is set, the peak current used (not the average current) must be lower than 60 milliamperes.

3. Hook off operation when "calling"

when the handset is hooked off to call a subscriber, the set starts using an average current in order that the telephone exchange may detect it and make ready to receive a dialling signal; after 400 milliseconds a dialling phase is set and the peak current during this phase must not exceed 70 milliamperes. Finally, after the connecting phase between the caller and the called person, the talking phase is again existing during which the peak current must not exceed 60 milliamperes.

As a general rule, current limitations are required to meet these standards, but moreover, limitations are useful to avoid an excessively high power consumption when overvoltages are involved.

As it is necessary in certain cases (short lines) to use an average current of at least 30 milliamperes when hooking off the handset after a ringing signal, it appears that a peak current limitation cannot be assigned below 110 milliamperes.

Thus, the integrated circuit CI has to set a peak current limitation to 110 or 120 milliamperes but not below this threshold for about 400 milliseconds after the hooking off of the handset (that is after the voltage is applied to the integrated circuit CI). In this manner, the calling interruption standards when "called" can be complied with. Then, after 400 milliseconds, the integrated circuit will limit the current to 60 mA, either for the dialling phase, or for the speech phase.

If an overvoltage occurs on the line during the handset hook off phase, this overvoltage will be limited to about 100 volts RMS by the primary protection component CPP, and it will give rise to a power consumption of about 6 watts for about 400 milliseconds, and of about 3 watts afterwards.

Those power requirements are too high and demand the use of expensive transistors in the high-voltage stage EHT.

A proposal has already been made to limit the supplementary peak power consumption after a period higher than 400 milliseconds; this limitation is achieved by means of the secondary protection circuit CPS shown in FIG. 1.

This circuit is carried out by means of components external to the integrated circuit CI (Zener diode, resistors, capacitor, transistor); it acts upon the biasing of the high-voltage stage for limiting to about 30 mA the used peak current; this circuit acts only in case of overvoltages and after a certain delay further to the application of an overvoltage.

The delay is broadly calculated so as to be much higher than 400 milliseconds in spite of the scattering of the resistor and capacitor values of circuit CPS. In this way, the protection circuit does not impair the hooking off phase of the receiver when "called". In practice, one has to provide for an average delay of several seconds for taking this scattering of the components into account.

Consequently, 3 watts may be scattered for several seconds, after a consumption of 6 watts for 400 milliseconds.

BRIEF DESCRIPTION OF THE INVENTION

This energy consumption is too high and an object of the instant invention is to reduce it by means of a secondary protection circuit incorporated into the integrated circuit CI assuming the main functions of the set, this protection circuit limiting to a first value the current used by the high-voltage stage during a first period of time after the hooking off of the receiver, then to a second value lower than the first one after this first period of time, and finally limiting the current to a third value lower than the second one after a second period of time in relation with either the first period of time if the overvoltage has appeared during the first period of time, or the occurrence of an overvoltage if the first period of time has already been completed at this occurrence.

More precisely, the circuit according to the invention comprises:

a first capacitor and a charging means for this capacitor, this means being connected with the high-voltage stage output for charging the capacitor from the occurrence of a feeding voltage at the output of the high-voltage stage;

a first threshold comparator connected with the capacitor for establishing a first control signal after a first period of time which follows the occurrence of a feeding voltage at the output of the high-voltage stage;

a second threshold comparator for detecting the presence of an overvoltage at the high-voltage stage terminals and then for supplying a second control signal;

a second capacitor and a charging means for this capacitor, this charging means being inhibited in the absence of the first control signal and of the second control signal;

a third threshold comparator connected with the second capacitor for establishing a third control signal after a second period of time which follows the beginning of the charging of the second capacitor;

a limitation means of the output current of the high-voltage stage, receiving the first and the third control signal and adapted to restrict the current to a first value when the first signal is on and to a second value lower than the first one when the third control signal is on.

In a preferred embodiment, the high-voltage stage comprises a transistor or a set of transistors (Darlington, for example) with a base biasing resistor of a high value, a collector connected with the rectifying bridge feeding the high-voltage stage, and an emitter connected with the output of the high-voltage stage; the current limitation means then comprises a transistor, the base of which is connected with the output of the high-voltage stage, the collector of which is connected through a resistor with the base biasing resistor, and the emitter of which is connected by means of a plurality of series diodes with a common junction; the common junction is further connected by means of a resistor with the base of the transistor making up the limitation means; the diodes can be bypassed under the control of the first and third control signals.

BRIEF DESCRIPTION OF THE DRAWINGS

Other features and advantages of the instant invention will clearly appear in the following detailed description of preferred embodiments, in connection with the attached drawings, wherein.

DETAILED DESCRIPTION OF PREFERRED EMBODIMENTS

Figure 1:
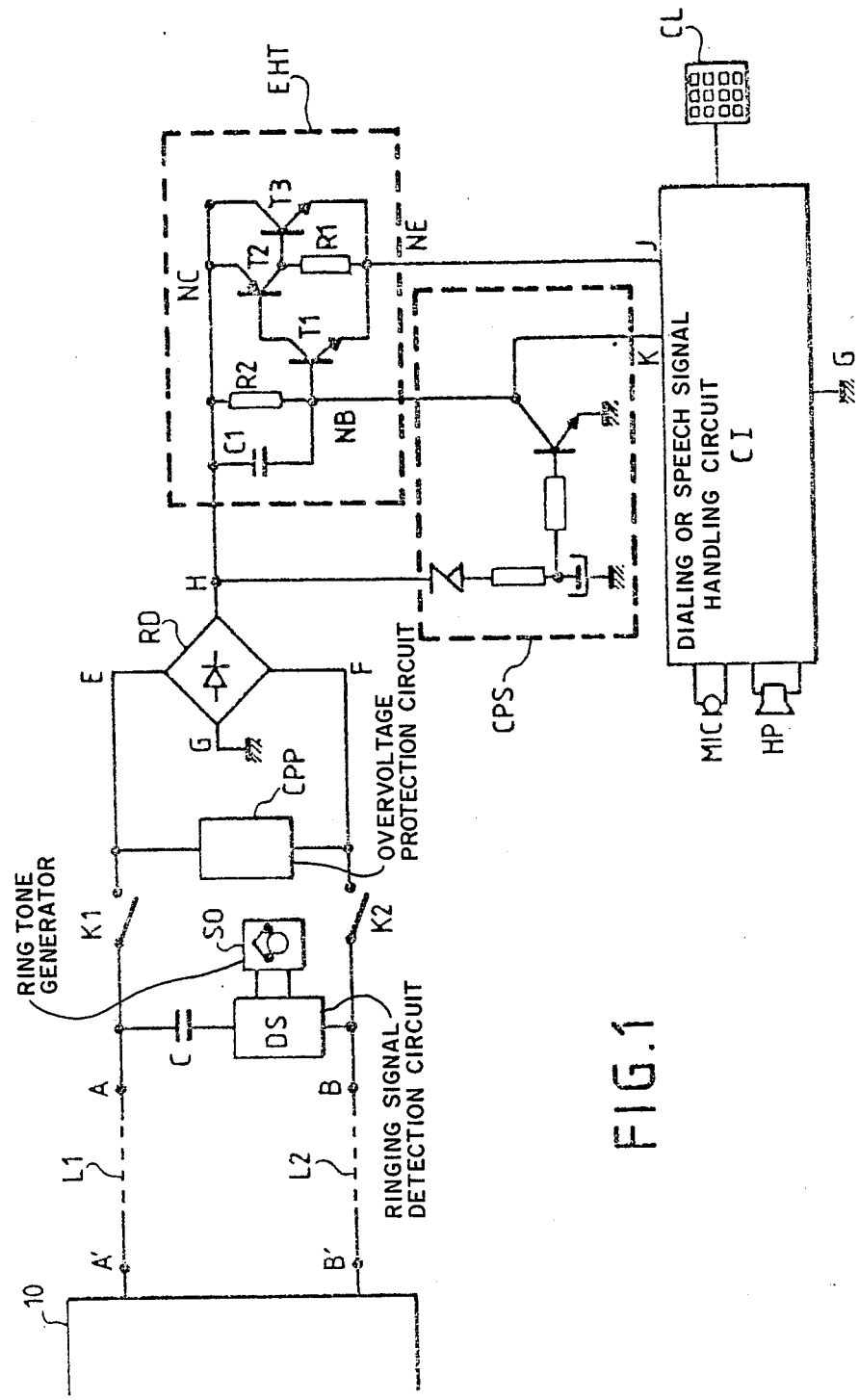
FIG. 1, already disclosed, shows an embodiment of telephone set circuits in accordance with prior art.
Figure 2:
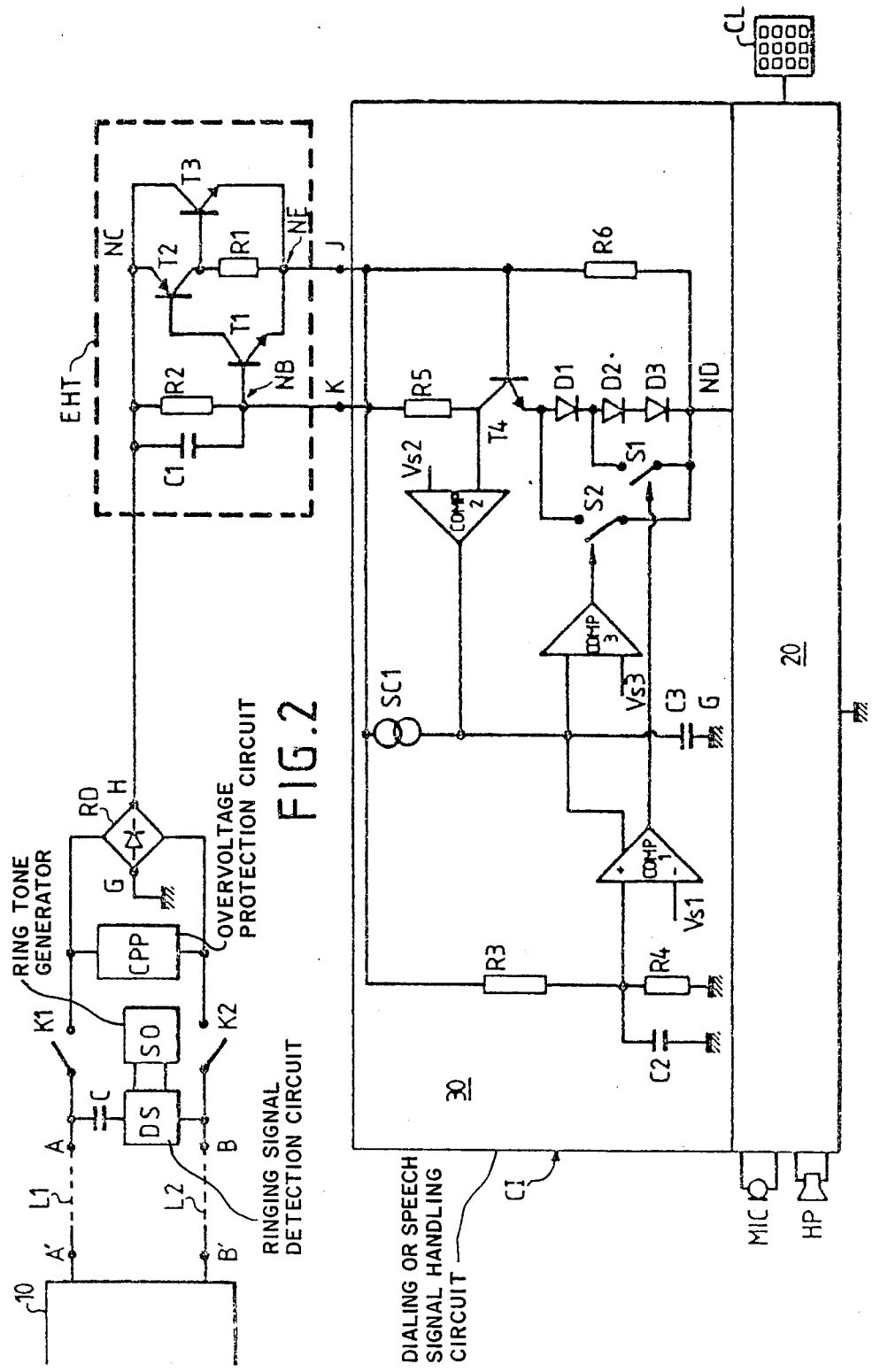
FIG. 2 shows a block diagram of a telephone set protection circuit according to the invention.

In FIG. 2, same elements as in FIG. 1 are labelled with the same references. It particularly concerns all the elements located before the high-voltage stage EHT, between the telephone exchange 10 and the rectifying bridge RD.

The integrated circuit CI which fulfills the main functions of the set (processing of the emitted and received speech signals, dialling, setting of the ranges of voltage-current in the various phases) is fed by the high-voltage stage EHT and is connected with the keyboard or dial CL, as well as with the microphone MIC and with the loudspeaker HP of the receiver. The main functions of the set are achieved by a part of the integrated circuit; this part is labelled with reference 20 in FIG. 2 and is fed by another part of the integrated circuit, labelled with reference 30.

The high-voltage stage EHT is preferably constituted in the following manner;

It comprises a set of transistors T1, T2, T3 constituting a regulator incorporated between the output H of the rectifying bridge and a feeding terminal J of the integrated circuit CI.

Transistor T1, of the NPN type, has its emitter connected with a common junction NE of the stage EHT, its base being connected with a common junction NB, its collector being connected with the base of transistor T2, of the PNP type; transistor T2 has its emitter connected with a common junction NC, and its collector is connected on the one hand with the base of transistor T3, of the NPN type, and on the other hand with a resistor R1 further connected with the junction NE; finally, transistor T3 has its emitter connected with junction NE and its collector connected with junction NC.

Junction NE represents the emitter of an equivalent transistor constituted by the three transistors T1, T2, T3 so connected; junction NB represents its base, and junction NC its collector.

Junction NC is connected with the output terminal H of the rectifying bridge, and junction NE is connected with an input terminal J of the integrated circuit. As for junction NB, it is connected with another input terminal K of the integrated circuit CI.

To end the detailed description of this embodiment of the high-voltage stage EHT, junction NB is connected with output terminal H of the rectifying bridge by a biasing resistor with a high value R2 and a capacitor C1 parallel connected with this resistor.

The secondary protection circuit according to the invention, which is incorporated between terminals J and K and the active part of integrated circuit CI, is an integral part of circuit CI and is therefore not carried out as in the prior art by means of external components.

This protection circuit comprises a first capacitor C2 and a charging means for this capacitor adapted to charge the capacitor from the moment when a feeding voltage is existing on the feeding terminal J of the integrated circuit. The charging means is made up by a resistor R3 connected on the one hand with a capacitor terminal C2 and on the other hand with the terminal J; the other capacitor terminal C2 is connected to the ground G.

A resistor R4 is parallel connected with capacitor C2 for unloading it when there is no voltage on terminal J.

The first terminal of capacitor C2 is connected with an input of a first threshold comparator which supplies a first control signal when the voltage through the capacitor terminals exceeds a first threshold Vs1.

The protection circuit comprises a second threshold comparator COMP2 supplying a second control signal when the voltage on the feeding terminal J exceeds a threshold corresponding to an overvoltage VS on terminal H. The operation of comparator CMP2 will be further explained.

The protection circuit further comprises a second capacitor C3, a load means for this capacitor and a third threshold comparator COMP3.

Capacitor C3 has one terminal connected with ground G and another one connected with the charging means made up in this case by a power supply SC1. Comparator COMP3 has one input connected with the second terminal of capacitor C3 and supplies a third control signal when the voltage through the terminal of capacitor C3 exceeds a threshold Vs3.

An output of comparator COMP1 is connected with capacitor C3 in order to prevent its charging as long as the charge of capacitor C1 is not sufficient enough to trigger the first comparator COMP1.

The output of second comparator COMP2 is also connected with capacitor C3 to prevent its charging as long as the second comparator is not triggered, that is if there is no overvoltage on terminal H.

Finally, the second protection circuit comprises a limitation means of the current used by the high-voltage stage EHT, this limitation means essentially comprises a set-up with transistors, diodes, and resistors, incorporated between terminals J and K on the one hand and the remaining part of the integrated circuit on the other hand. This limitation means is controlled by the first and third comparators.

In the shown example, the limitation means is constituted by a transistor T4, two resistors R5 and R6, and three diodes D1, D2, D3.

The emitter of transistor T4 is connected with the whole set of three serial diodes D1, D2, D3, this set being further connected with a circuit common junction ND through which a current supply is supplied to the remaining part of the integrated circuit. More precisely, the anode of diode D1 is connected with the emitter of transistor T4 and cathode of D3 is connected with junction ND.

The transistor collector T4 is connected by means of a resistor R5 with junction NB. The input of the threshold comparator COMP2 is connected with transistor collector T4.

The base of transistor T4 is connected with junction NE and a resistor R6 is connected between the junctions NE and ND.

Finally, a switch S1, controlled by an output of the first comparator COMP1, permits to bypass the diodes D2 and D3 when comparator COMP1 is triggered and supplies the first control signal. A switch S2, controlled by the third comparator COMP3, permits to bypass the three serial diodes D1, D2, D3 when comparator COMP3 is triggered and gives the third control signal.

Operation of the circuit

In normal operating conditions, if there is no overvoltage on the line, the hooking off of the handset causes the closing of switches K1 and K2 and the application on terminal H of a feeding voltage coming from the telephone exchange (to which is possibly superimposed an alternating component caused by the ringing signal if the hooking off of the handset is made after a call).

In the phase which immediately follows the hooking off of the handset, one wishes that the average current used by the line may reach 30 milliamperes, which requires that the peak current be not limited to a too low value by the current limitation means connected with terminals J and K of the integrated circuit.

Consequently, during a first period which is preferably of 250 milliseconds, the limitation means acts for limiting the peak current to 120 milliamperes.

The limit is set in relation with the values of resistors R5 and R6.

Switches S1 and S2 are open. The duration of this initial phase is set by the time constant R3.C2 and the threshold Vs1; it is chosen in he range of 250 milliseconds and it will be noted that the peak current is limited to 120 milliamperes during this first time period even if an overvoltage was existing on the line at the moment when the handset was hooked off and even if an overvoltage appears during this first time period. No limitation lower than 120 milliamperes is authorized during this period; this is due to the fact that the first comparator COMP1 is not triggered prior to the end of the 250 milliseconds; it then inhibits the charging of capacitor C3 and the comparator COMP3 cannot either be triggered; switches S1 and S2 cannot close.

At the end of the first time period, comparator COMP1 is triggered and closes switch S1, bypassing diodes D2 and D3; at the same time, it stops inhibiting the charge of capacitor C3 (but the second comparator inhibits this charge in normal operating conditions, that is if there is no overvoltage).

When diodes D2 and D3 are bypassed, the voltage through the resistor R6 necesarily drops. Indeed, the conductivity of transistor T4 starts increasing, which lowers the potential of junction NB and decreases the current entering terminal J and therefore the current flowing through resistor R6.

The bypassing of diodes D2 and D3 therefore limits the peak current used by the circuit. From a practical point of view, if the emitter-base junction of transistor T4 is of the same size as the junction of the three diodes, the maximum current is reduced by half when two of the diodes are bypassed; it will be further reduced by half when the last one is bypassed.

When there is no overvoltage on terminal H, the peak current is then limited to about 60 milliamperes after the first period of 250 milliseconds.

If there is an overvoltage on the line, comparator COMP2 will detect it and will authorize the charging of capacitor C3; this charging lasts about 100 milliseconds (for example); after this time period, the third comparator COMP3 will be triggered and closes switch S2, limiting the current consumption to a third value which is preferably half of the previous one, that is 30 peak milliamperes.

It will be understood that this limitation will happen after a time period which can begin only after the end of the first 250 milliseconds period because one does not want to get this limitation before. If this overvoltage was existing before or during the first time period, the second time period will begin immediately after; if the overvoltage occurs later, the second time period will being only after the occurrence of the overvoltage.

Figure 3:
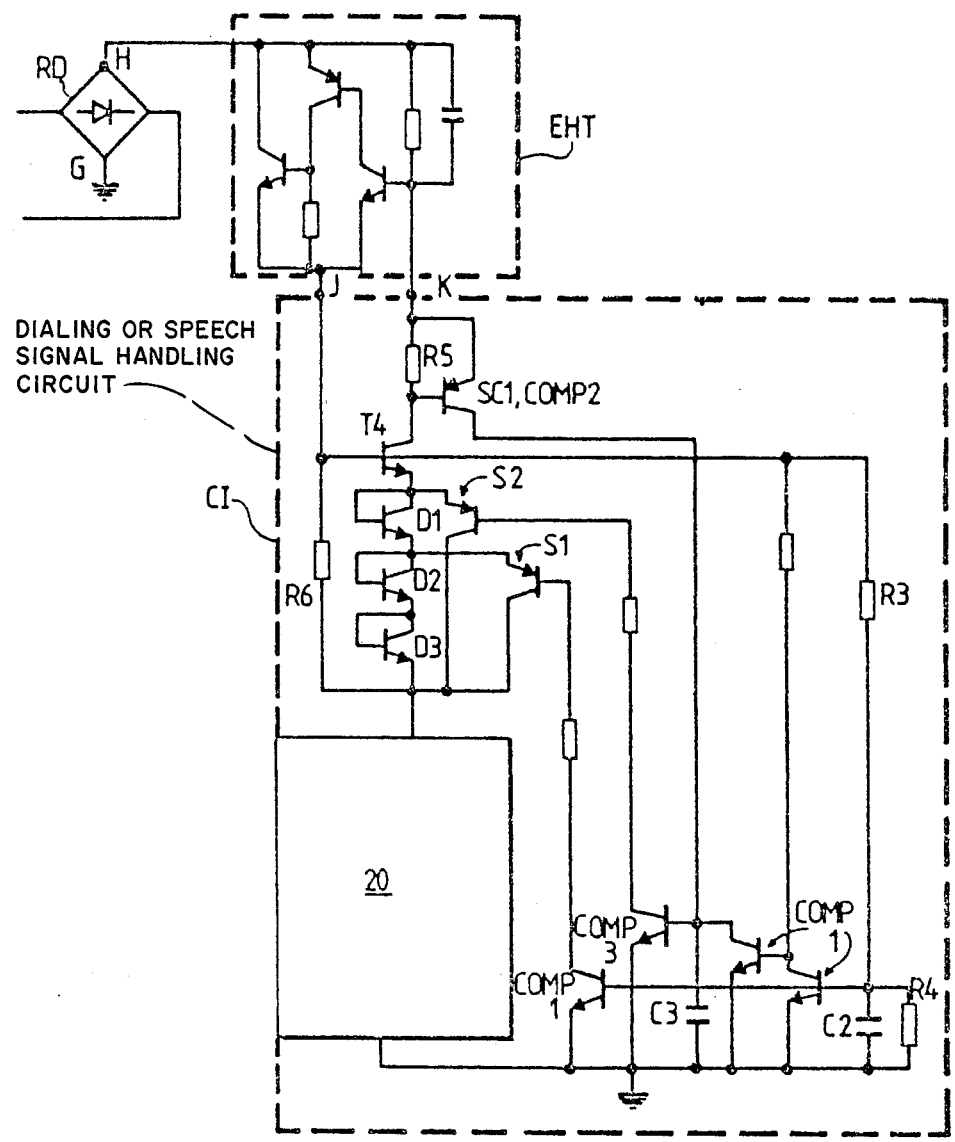
FIG. 3 shows a detailed drawing of the protection circuit according to a preferred embodiment of this invention.

FIG. 3 shows an an illustrative example a detailed bipolar implementation of the circuit.

I claim:

1. A protection circuit for telephone sets, for the protection of an integrated circuit (CI) fed by a telephone line through a high-voltage stage (EHT), comprising:
   a first capacitor (C2) and first charging means (R3) for said first capacitor, said first charging means being connected with the output of the high-voltage stage for charging the capacitor from the occurrence of a voltage at the output of the high-voltage stage;
   a first threshold comparator (COMP1) connected with the first capacitor (C2) for establishing a first control signal after a first time period following said occurrence of a feeding voltage at the output of the high-voltage stage;
   a second threshold comparator (COMP2) for detecting the occurrence of an overvoltage through the terminals of the high-voltage stage and for then supplying a second control signal;
   a second capacitor (C3) and second charging means (SC1) for charging said second capacitor, said second charging means being inoperable to charge the second capacitor without receiving one of the first control signal and the second control signal;
   a third threshold comparator (COMP3) connected with the second capacitor for establishing a third control signal after a second time period following the beginning of the charging of the second capacitor;
   means (T4, D1, D2, D3, R6, S1, S2) for limiting the output current of the high-voltage stage, by receiving the first and third control signal and adapted to limit the current to a first value during reception of the first control signal and to a second value lower than the first one during reception of the third control signal.

* * * * *